US009069445B2

(12) United States Patent
Long et al.

(10) Patent No.: US 9,069,445 B2
(45) Date of Patent: Jun. 30, 2015

(54) ELECTRONIC DEVICE WITH TOUCH SCREEN AND PAGE FLIPPING METHOD

(71) Applicants: Huai-Yang Long, Shenzhen (CN); Chih-San Chiang, New Taipei (TW); Yun Zhao, Shenzhen (CN); Yue-Feng Ye, Shenzhen (CN); Hua-Dong Cheng, Shenzhen (CN); Han-Che Wang, New Taipei (TW)

(72) Inventors: Huai-Yang Long, Shenzhen (CN); Chih-San Chiang, New Taipei (TW); Yun Zhao, Shenzhen (CN); Yue-Feng Ye, Shenzhen (CN); Hua-Dong Cheng, Shenzhen (CN); Han-Che Wang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 273 days.

(21) Appl. No.: 13/650,486

(22) Filed: Oct. 12, 2012

(65) Prior Publication Data
US 2013/0141359 A1 Jun. 6, 2013

(30) Foreign Application Priority Data
Dec. 3, 2011 (CN) .......................... 2011 1 0395470

(51) Int. Cl.
G06F 3/041 (2006.01)
G06F 3/0482 (2013.01)
G06F 3/0483 (2013.01)
G06F 3/0488 (2013.01)

(52) U.S. Cl.
CPC ............ G06F 3/0482 (2013.01); G06F 3/0483 (2013.01); G06F 3/04883 (2013.01)

(58) Field of Classification Search
CPC .. G06F 3/0482; G06F 3/04883; G06F 3/0483
USPC .................................. 345/173, 473; 715/773
See application file for complete search history.

(56) References Cited

U.S. PATENT DOCUMENTS

| 2010/0146386 A1* | 6/2010 | Ma et al. ........................ 715/261 |
| 2010/0146456 A1* | 6/2010 | Tanaka ........................... 715/862 |
| 2011/0080253 A1* | 4/2011 | Sakamoto ...................... 340/4.3 |

(Continued)

FOREIGN PATENT DOCUMENTS

| CN | 101833416 A | 9/2010 |
| CN | 101976169 A | 2/2011 |
| CN | 102043560 A | 5/2011 |

OTHER PUBLICATIONS
Adobe Acrobat 8 User Guide (2007).*

*Primary Examiner* — Allison Johnson
*Assistant Examiner* — Vinh Lam
(74) *Attorney, Agent, or Firm* — Novak Druce Connolly Bove + Quigg LLP

(57) ABSTRACT

A page flipping method for an electronic device is provided. An exemplary method includes the following steps: displaying an interface comprising a page preview region and a page flipping region; displaying a page on the page flipping region, and displaying an icon group comprising a plurality of icons on the page preview region; determining whether a flipping gesture is applied on the page flipping region; determining the type of the flipping gesture; determining a page flipping manner according to the determined result of the gesture and a function table, and retrieving a corresponding target page according to the determined page flipping manner; creating a new icon group according to the retrieved target page; and displaying the target page on the page flipping region, and displaying the created new icon group on the page preview region. An electronic device using the page processing method is also provided.

10 Claims, 5 Drawing Sheets

(56) References Cited

U.S. PATENT DOCUMENTS

| | | | |
|---|---|---|---|
| 2012/0044151 A1* | 2/2012 | Wilson et al. | 345/173 |
| 2012/0102425 A1* | 4/2012 | Song | 715/776 |
| 2012/0139857 A1* | 6/2012 | Terebkov et al. | 345/173 |
| 2012/0159613 A1* | 6/2012 | Griffin et al. | 726/19 |

* cited by examiner

| The types of the use's touch operations | Page flipping manners |
|---|---|
| horizontally sliding leftward | Flip to the page corresponding to the grid on the right of the grid corresponding to the current page |
| horizontally sliding rightward | Flip to the page corresponding to the grid on the left of the grid corresponding to the current page |
| vertically sliding upward | Flip to the page corresponding to the grid below the grid corresponding to the current page |
| vertically sliding downward | Flip to the page corresponding to the grid above the grid corresponding to the current page |
| obliquely sliding to the bottom left | Flip to the page corresponding to the grid on the top right of the grid corresponding to the current page |
| obliquely sliding to the top left | Flip to the page corresponding to the grid on the bottom right of the grid corresponding to the current page |
| obliquely sliding to the bottom right | Flip to the page corresponding to the grid on the top left of the grid corresponding to the current page |
| obliquely sliding to the top right | Flip to the page corresponding to the grid on the bottom left of the grid corresponding to the current page |

FIG. 3

ELECTRONIC DEVICE WITH TOUCH SCREEN AND PAGE FLIPPING METHOD

BACKGROUND

1. Technical Field

The present disclosure relates to an electronic device with a touch screen and a page flipping method.

2. Description of Related Art

Nowadays, electronic devices with touch screens, e.g., mobile phones, digital photo frames, electronic readers (e-reader), are capable of storing and displaying electronic documents (e.g., digital images, digital texts, etc). Usually, users select a page via touch operations on the touch screen of the electronic device. For example, the user can flip to a previous page or a next page via sliding rightward or leftward on the displayed page. However, if the target page is far away from the displayed page, that is, there are a number of pages between the target page and the displayed page, a number of sliding operations are needed to be applied on the touch screen to flip to the target page, which is rigid and not natural enough.

Therefore, what is needed is an electronic device and a page flipping method to alleviate the limitations described above.

BRIEF DESCRIPTION OF THE DRAWINGS

The components in the drawings are not necessarily drawn to scale, the emphasis instead being placed upon clearly illustrating the principles of an electronic device and a page flipping method. Moreover, in the drawings, like reference numerals designate corresponding sections throughout the several views.

FIG. 3 is a function table stored in the electronic device of FIG. 1, which records the corresponding relationships between a number of types of touch operations and a number of page flipping methods.

DETAILED DESCRIPTION

Figure 1:
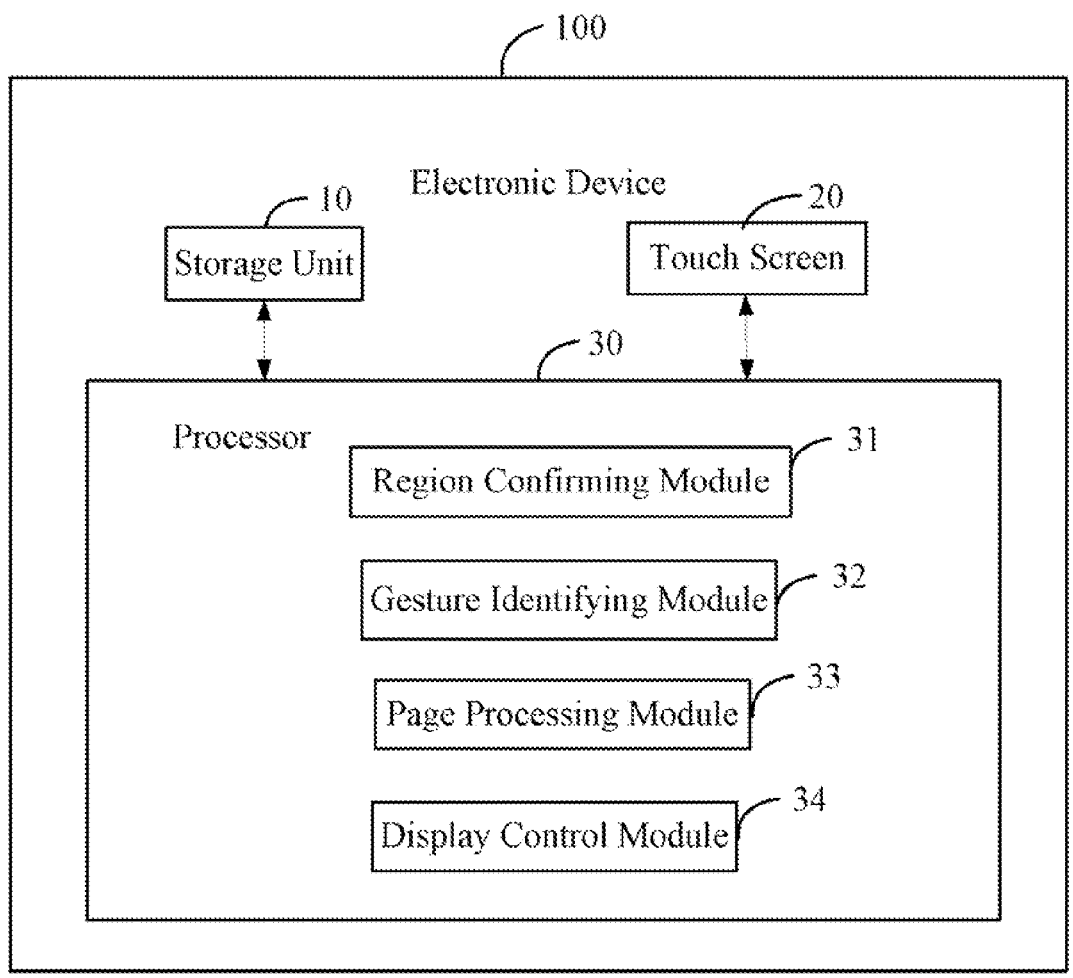
FIG. 1 is a block diagram of an electronic device in accordance with an exemplary embodiment.

Referring to FIG. 1, an electronic device 100 is disclosed as an exemplary embodiment. The electronic device 100 can flip to the target page quickly and accurately in response to a touch operation from a user. The electronic device 100 is an electronic reader. In alternative embodiments, the electronic device 100 can be other electronic devices with touch screens, such as a mobile phone, a tablet, or a digital photo frame, for example.

The electronic device 100 includes a storage unit 10, a touch screen 20, and a processor 30. The storage unit 10 stores a plurality of electronic files.

Figure 2:
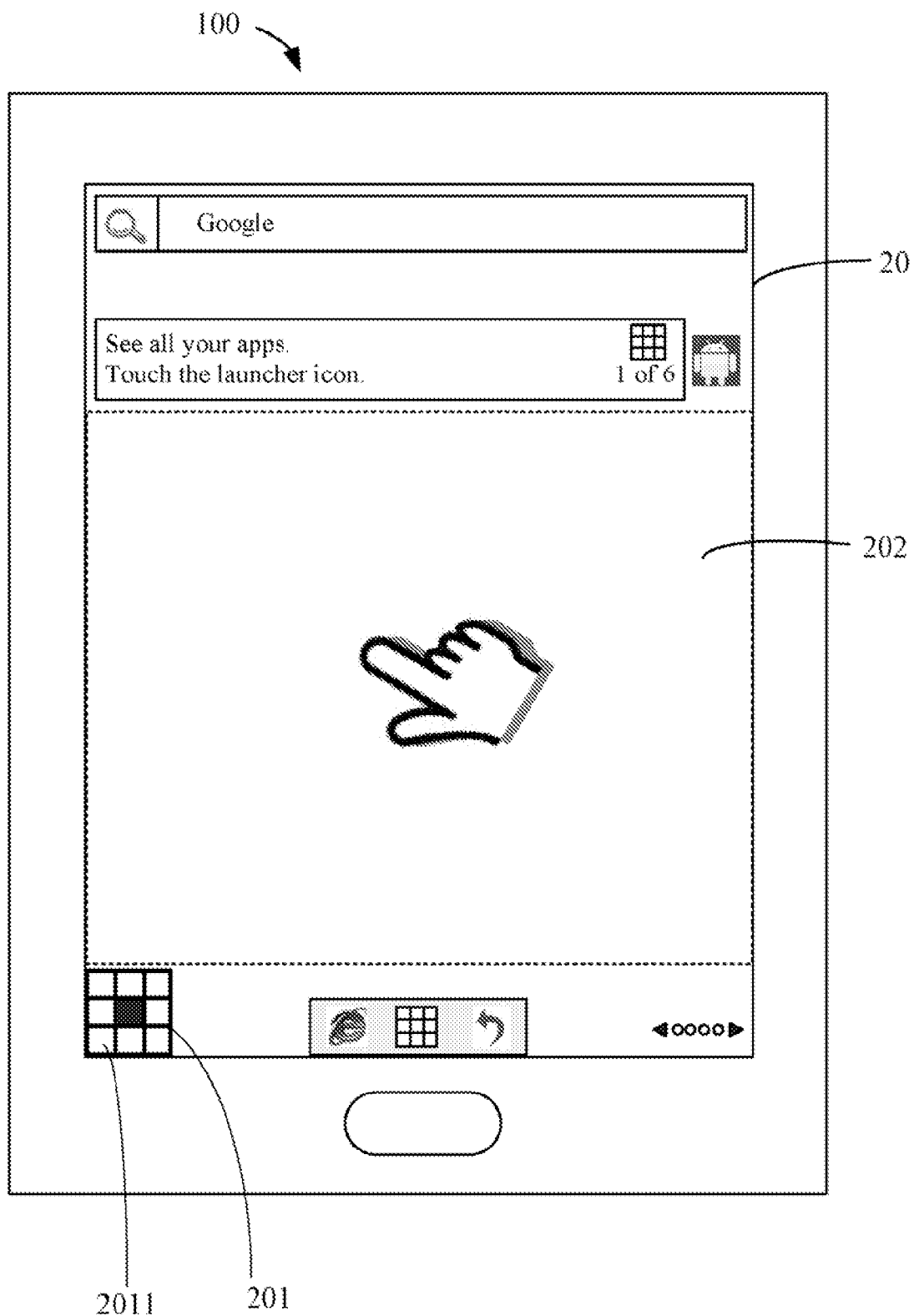
FIG. 2 is a schematic diagram of the electronic device of FIG. 1.

The touch screen 20 is configured for generating corresponding operation signals in response to a touch operation applied on the touch screen 20. FIG. 2 illustrates that in response to an operation of a user, the touch screen 20 displays an interface. The displayed interface includes a page preview region 201 and a page flipping region 202. The page preview region 201 displays an icon group representing the displayed page and pages adjacent to the displayed page, which includes a set of pages preceding the displayed page and a set of pages next to the displayed page. In the embodiment, the icon group includes a number of grids 2011. Each grid 2011 represents and corresponds to a page. In this embodiment, the displayed interface is selected from the group consisting of desktop interface of the electronic device 100, and application interfaces of application software. The desktop interface is for displaying the major desktop and assistant desktops of the electronic device 100. The application interfaces of application software display contents such as electronic files page by page. In the embodiment, both the desktops in the desktop interface and the content pages in the application interface are named as "pages". In an alternative embodiment, the icon group includes a group of other icons such as circles, triangles, ellipses for example, corresponding to a group of pages.

In the embodiment, the touch screen 20 displays a page preview region 201 and a page flipping region 202 when the electronic device 100 is under the page viewing mode. The page preview region 201 is located on the lower left corner of the touch screen 20. The grid corresponding to the currently displayed page (hereinafter "the current page") is filled with black. In the embodiment, the page preview region 201 includes nine grids corresponding to nine pages respectively. In an alternative embodiment, the number of grids included in the page preview region 201 can be defined according to actual needs, and the grid corresponding to the current page can be filled with other colors such as red, green for example.

The page flipping region 202 is configured to generate operation signals in response to a sliding touch operation. On the page flipping region 202, the user can slide leftward, rightward, upward, downward, and obliquely left, right, up, and down.

The processor 30 includes a region confirming module 31, a gesture identifying module 32, a page processing module 33, and a display control module 34. When the electronic device 100 enters the page viewing mode, the touch screen 20 displays a default page in response to the touch operation. The region confirming module 31 is configured to determine whether a touch event occurs on the page flipping region 202 according to operation signals of the user.

If the region confirming module 31 determines that the event occurs on the page flipping region 202, the gesture identifying module 32 determines whether the touch operation is a flipping gesture according to the operation signals generated by the touch screen 20 in response to the touch operation. In this embodiment, when the touch operation of the user is a slide operation on the page flipping region 202, the gesture identifying module 32 determines the touch operation of the user is a flipping gesture. The gesture identifying module 32 further determines the type of the flipping gesture according to the operation signals, and transmits the identified results of the gestures to the page processing module 33. The type of the flipping gesture includes sliding horizontally to the left, sliding horizontally to the right, sliding up vertically, sliding down vertically, sliding obliquely to the lower left, sliding obliquely to the upper left, sliding obliquely to the lower right, and sliding obliquely to the upper right.

Together referring to FIG. 3, the storage unit 10 further stores a function table 12 recording the corresponding relationships between a number of types of touch operations and a number of page flipping methods.

The page processing module 33 is configured to determine a page flipping method according to the identified result of the gesture transmitted from the gesture identifying module 32 and the function table 12 stored in the storage unit 10. The page processing module 33 further retrieves a corresponding target page stored in the storage unit 10 according to the determined page flipping method. In the embodiment, the page flipping method includes determining a corresponding target grid according to the gesture of the user, and determining the page corresponding to the target grid as the target page. For example, when the gesture identifying module 32 determines the type of the gesture of the user is one of the following types: horizontally sliding leftward, horizontally sliding rightward, vertically sliding upward, vertically sliding downward, obliquely sliding to the lower left, obliquely sliding to the upper left, obliquely sliding to the lower right, and obliquely sliding to the upper right. The page processing module 33 will retrieve the grid at the right side of, at the left side of, below, above, at the upper right side of, at the lower right side of, at the upper left side of, or at the lower left side of the grid corresponding to the current page. In this embodiment, when the angle between the sliding trace of the touch operation and the horizontal axis of the coordinate system of the touch screen of the electronic device 100 falls between 0 degree and 30 degrees, the gesture identifying module 32 determines the type of the gesture is a horizontally sliding gesture. When the angle between the sliding trace of the touch operation and the vertical axis of the coordinate system of the touch screen of the electronic device 100 falls between 0 degree and 30 degrees, the gesture identifying module 32 determines the gesture is a vertically sliding gesture. When the angle between the sliding trace of the touch operation and the horizontal axis or the vertical axis falls between 30 degree and 60 degrees, the gesture identifying module 32 determines the gesture is an obliquely sliding gesture. The details of the page flipping method will be described with reference to FIG. 4 later.

The page processing module 33 is further configured to create a new icon group to-be-displayed on the page preview region 201 according to the retrieved target page. That is, the page processing module 33 creates a new icon group including a number of grids corresponding to the target page and the adjacent pages of the target page. In the embodiment, the information of each page is displayed on the corresponding grid of the generated icon group respectively. The information can be the page number of the page.

The display control module 34 controls to display the target page retrieved by the page processing module 33 on the page flipping region 202, and controls to display the new icon group created by the page processing module 33 on the page preview region 201.

Figure 4:
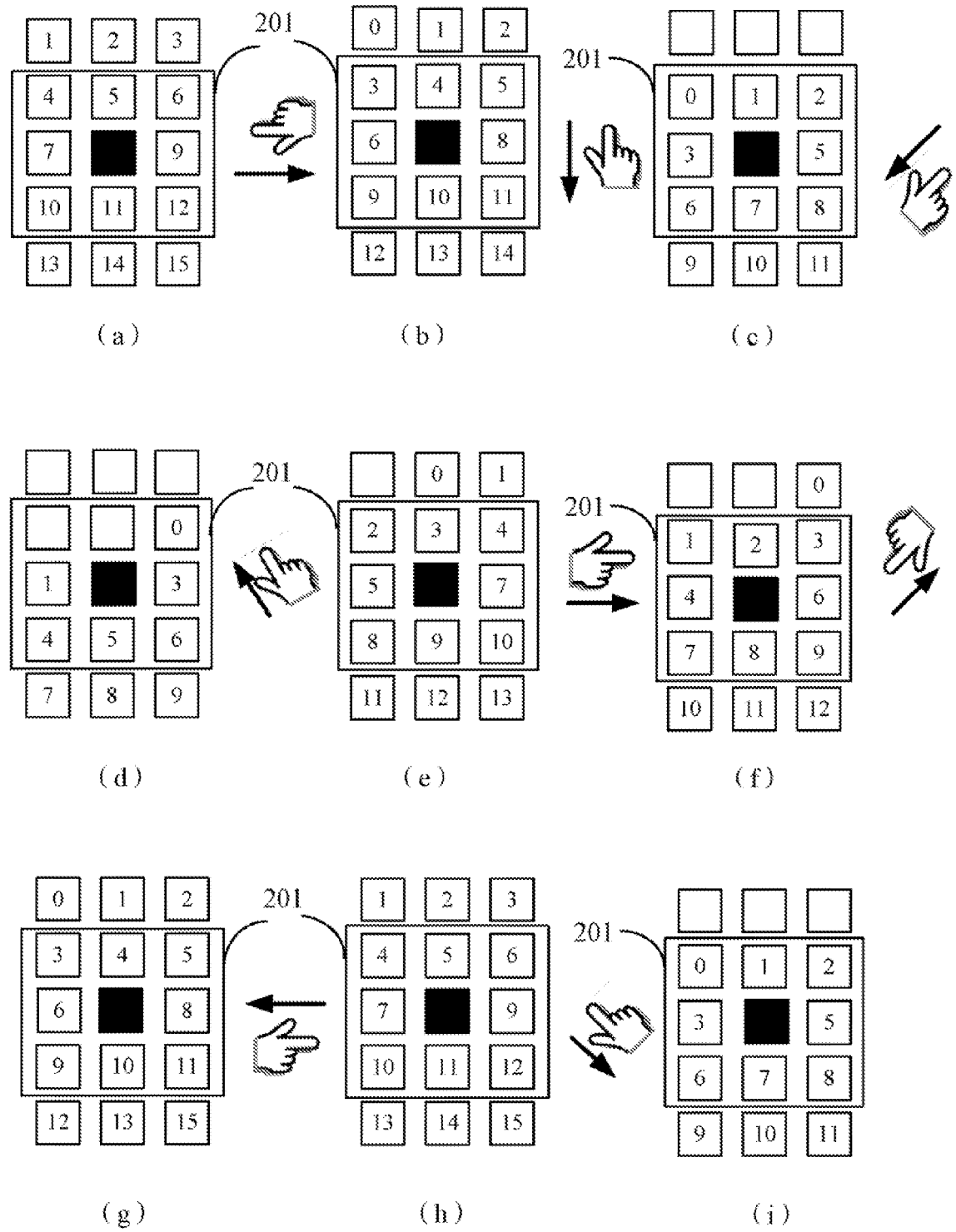
FIG. 4 is a number of schematic diagrams of the user interface of the electronic device of FIG. 1, showing the page flipping process, in accordance with an exemplary embodiment.

Referring to FIG. 4, a number of schematic diagrams of the user interface of the electronic device 100 showing the changes in the relationship between the displayed interfaces of page preview region 201 and the flipping gestures applied on the page flipping region 202 are illustrated. The grid filled with black corresponds to the current page displayed on the touch screen 20, and the numbers in the grids are the page numbers of the pages corresponding to the grids. For example, when the eighth page is the current page displayed on the touch screen 20, the page preview region 201 displayed on the page preview region 201 is as shown in FIG. 4(*a*). The grid is filled with black for representing the current page i.e., the eighth page.

If the user horizontally slides rightward on the page flipping region 202, that is, the target page is the page corresponding to the grid at the left side of the grid corresponding to the eighth page. Then, the page processing module 33 updates the current page with the seventh page, and updates the icon group displayed on the page preview region 201. As is shown in FIG. 4(*b*), the seventh page is the current page and is marked with black.

Then, if the user further vertically slides downward on the page flipping region 202, that is, the target page is the page corresponding to the grid above the grid corresponding to the seventh page. Then, the page processing module 33 updates the current page with the fourth page, and updates the icon group displayed on the page preview region 201. As is shown in FIG. 4(*c*), the fourth page is the current page and is marked with black.

Then, if the user further obliquely slides to the lower left on the page flipping region 202, that is, the target page is the page corresponding to the grid at the upper right side of the grid corresponding to the fourth page. Then, the page processing module 33 updates the current page with the second page, and updates the icon group displayed on the page preview region 201. As is shown in FIG. 4(*d*), the second page is the current page and is marked with black.

Then, if the user further obliquely slides to the upper left on the page flipping region 202, that is, the target page is the page corresponding to the grid at the lower left side of the grid corresponding to the second page. Then, the page processing module 33 updates the current page with the sixth page, and updates the icon group displayed on the page preview region 201. As is shown in FIG. 4(*e*), the sixth page is the current page and is marked with black.

Then, if the user further horizontally slides rightward on the page flipping region 202, that is, the target page is the page corresponding to the grid at the left side of the grid corresponding to the sixth page. Then, the page processing module 33 updates the current page with the fifth page, and updates the icon group displayed on the page preview region 201. As is shown in FIG. 4(*f*), the fifth page is the current page and is marked with black.

Then, if the user further obliquely slides to the upper right on the page flipping region 202, that is, the target page is the page corresponding to the grid at the lower right side of the grid corresponding to the fifth page. Then, the page processing module 33 updates the current page with the seventh page, and updates the icon group displayed on the page preview region 201. As is shown in FIG. 4(*g*), the seventh page is the current page and is marked with black.

Then, if the user further horizontally slides to the left on the page flipping region 202, that is, the target page is the page corresponding to the grid at the right side of the grid corresponding to the seventh page. Then, the page processing module 33 updates the current page with the eighth page, and updates the icon group displayed on the page preview region 201. As is shown in FIG. 4(*h*), the eighth page is the current page and is marked with black.

Then, if the user further obliquely slides to the lower right on the page flipping region 202, that is, the target page is the page corresponding to the grid at the upper left side of the grid corresponding to the eighth page. Then, the page processing module 33 updates the current page with the fourth page, and updates the icon group displayed on the page preview region 201. As is shown in FIG. 4(*i*), the fourth page is the current page and is marked with black.

Figure 5:
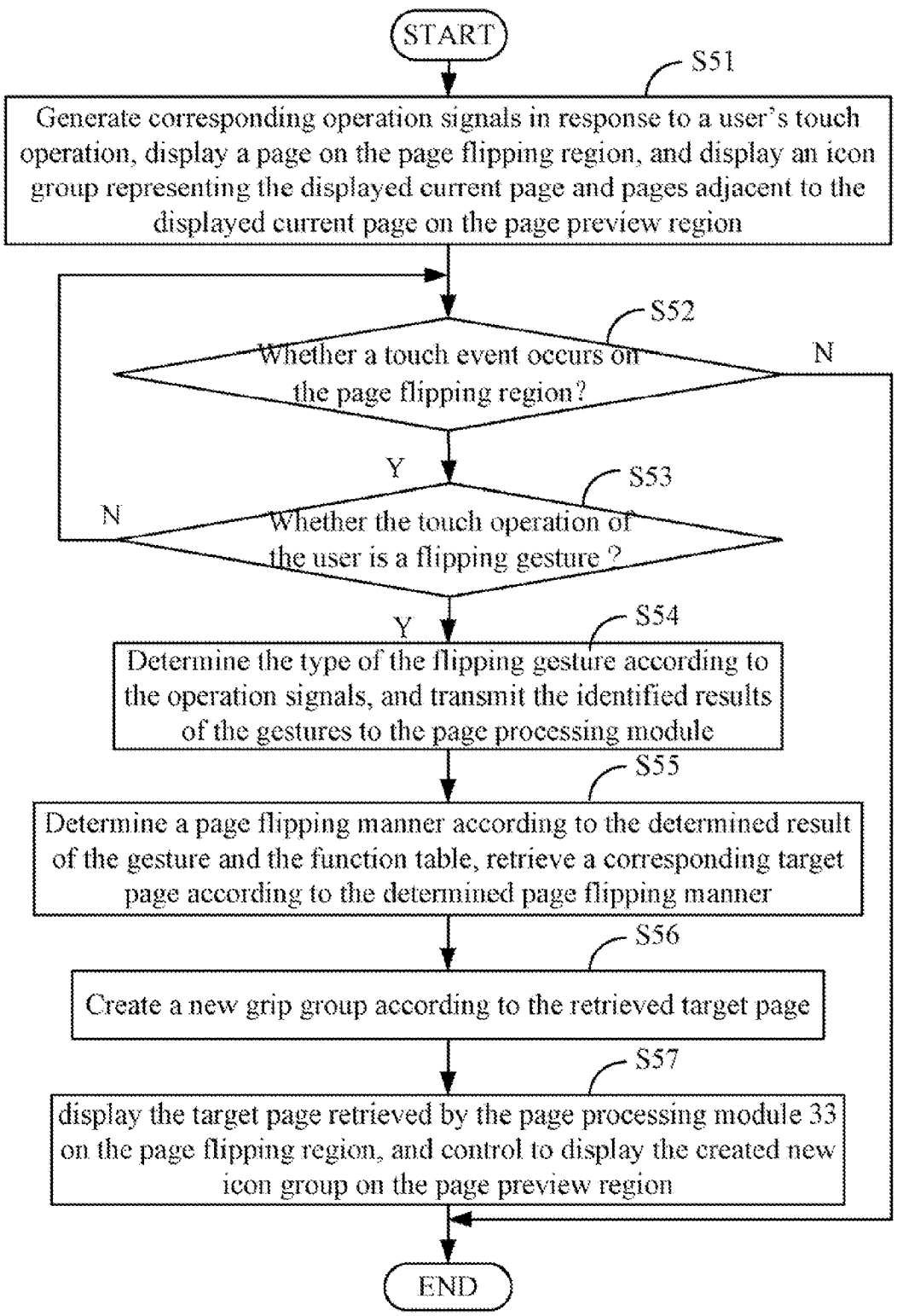
FIG. 5 is a flowchart of a page flipping method for electronic devices, such as the one of FIG. 1, in accordance with the exemplary embodiments.

Referring to FIG. 5, a flowchart of a page flipping method of the electronic device 100 of FIG. 1 is shown. The electronic device 100 includes a touch screen and a storage unit. The touch screen includes a page preview region and a page flipping region. The storage unit stores at least one electronic file and a function table. The function table records the corresponding relationships between a number of types of touch operations and a number of page flipping methods. The method includes the following steps, each of which is related to the various components contained in the electronic device 100.

In step S51, the touch screen 20 generates corresponding operation signals in response to a touch operation applied on the touch screen 20, displays a page on the page flipping region 202, and displays an icon group representing the displayed current page and pages adjacent to the displayed current page on the page preview region 201. The icon group includes a number of grids 2011. Each grid 2011 represents and corresponds to a page.

In step S52, the region confirming module 31 determines whether a touch event occurs on the page flipping region 202 according to the operation signals of the user. If yes, the process goes to step S53, otherwise, the process ends.

In step S53, the gesture identifying module 32 determines whether the touch operation of the user is a flipping gesture according to the operation signals. If yes, the process goes to step S54, otherwise, the process goes back to step S52. In this embodiment, when the touch operation is a slide operation on the page flipping region 202, the gesture identifying module 32 determines the touch operation is a flipping gesture.

In step S54, the gesture identifying module 32 determines the type of the flipping gesture according to the operation signals, and transmits the identified results of the gestures to the page processing module 33. In this embodiment, the type of the flipping gesture includes horizontally sliding leftward, horizontally sliding rightward, vertically sliding upward, vertically sliding downward, obliquely sliding to the lower left, obliquely sliding to the upper left, obliquely sliding to the lower right, and obliquely sliding to the upper right.

In step S55, the page processing module 33 determines a page flipping manner according to the determined result of the gesture transmitted from the gesture identifying module 32 and the function table 12 stored in the storage unit 10, retrieves a corresponding target page stored in the storage unit 10 according to the determined page flipping method. In the embodiment, the page flipping method includes determining a corresponding target grid according to the gesture of the user, and determining the page corresponding to the target grid as the target page.

In step S56, the page processing module 33 creates a new icon group according to the retrieved target page.

In step S57, the display control module 34 controls to display the target page retrieved by the page processing module 33 on the page flipping region 202, and controls to display the created new icon group on the page preview region 201.

With such a configuration, the user can clearly preview the icon group representing the displayed page and pages adjacent to the displayed page on the page preview region 201 located at the lower right of the touch screen 20, and slides on the page flipping region 202 of the touch screen 20 accordingly for flipping to a desired page. Then, the touch screen 20 displays the desired page. The user can flip conveniently and accurately to the desired page, which improves the page flipping efficiency and saves the time of the user.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A page flipping method for an electronic device having a touch screen and a storage unit, the method comprising: displaying an interface on the touch screen, the interface comprising a page preview region and a page flipping region;
displaying a page on the page flipping region, and displaying an icon group comprising a plurality of icons on the page preview region, the plurality of icons corresponding to the page on the page flipping region and pages adjacent to the page;
determining whether a flipping gesture is applied on the page flipping region;
if a flipping gesture is a slide operation applied on the page flipping region, determining a type of the flipping gesture, the type of the flipping gesture being selected from a group consisting of: obliquely sliding to the lower left, obliquely sliding to the upper left, obliquely sliding to the lower right, and obliquely sliding to the upper right;
if the flipping gesture of obliquely sliding to the lower left is applied on the page flipping region, retrieving a page associated with the icon at the upper right side of the icon associated with the current page as a target page; if the flipping gesture of obliquely sliding to the upper left is applied on the page flipping region, retrieving a page associated with the icon at the lower right side of the icon associated with the current page as a target page; if the flipping gesture of obliquely sliding to the lower right is applied on the page flipping region, retrieving a page associated with the icon at the upper left side of the icon associated with the current page as a target page; and if the flipping gesture of obliquely sliding to the upper right is applied on the page flipping region, retrieving a page associated with the icon at the lower left side of the icon associated with the current page as a target page;
creating a new icon group according to the retrieved target page; and
displaying the target page on the page flipping region, and displaying the created new icon group on the page preview region.

2. The method as described in claim 1, wherein the type of the flipping gesture is further selected from the group consisting of: horizontally sliding leftward, horizontally sliding rightward, vertically sliding upward, and vertically sliding downward.

3. The method as described in claim 2, wherein the step "determining a page flipping manner according to the determined result of the gesture and a function table, and retrieving a corresponding target page from the storage unit according to the determined page flipping manner" comprises:
if the flipping gesture of horizontally sliding leftward is applied on the page flipping region, retrieving a page associated with the neighboring icon at the right side of the icon associated with the current page as a target page;
if the flipping gesture of horizontally sliding rightward is applied on the page flipping region, retrieving a page associated with the neighboring icon at the left side of the icon associated with the current page as a target page;
if the flipping gesture of vertically sliding upward is applied on the page flipping region, retrieving a page associated with the neighboring icon below the icon associated with the current page as a target page; and
if the flipping gesture of vertically sliding downward is applied on the page flipping region, retrieving a page associated with the neighboring icon above the icon associated with the current page as a target page.

4. The method as described in claim 1, wherein the icon group comprises a plurality of icons arranged in an array.

5. An electronic device, comprising:
- a touch screen, configured for displaying an interface on the touch screen, the interface comprising a page preview region and a page flipping region, the touch screen configured for displaying a page on the page flipping region, and displaying an icon group comprising a plurality of icons on the page preview region, the plurality of icons corresponding to the page on the page flipping region and pages adjacent to the page;
- a storage unit storing a function table recording the corresponding relationships between a plurality of types of touch operations and a plurality of page flipping manners; and
- a processor comprising:
  - a region confirming module, configured for generating corresponding operation signals in response to a user's touch operation applied on the touch screen, displaying a page on the page flipping region, and displaying an icon group comprising a plurality of icons on the page preview region, the plurality of icons corresponding to the current page and pages adjacent to the current page;
  - a gesture identifying module, configure for determining whether a flipping gesture is applied on the page flipping region, and if a flipping gesture is a slide operation applied on the page flipping region, determining a type of the flipping gesture, the type of the flipping gesture being selected from a group consisting of: obliquely sliding to the lower left, obliquely sliding to the upper left, obliquely sliding to the lower right, and obliquely sliding to the upper right;
  - a page processing module, configured for: retrieving a page associated with the icon at the upper right side of the icon associated with the current page as a target page, if the flipping gesture of obliquely sliding to the lower left is applied on the page flipping region; retrieving a page associated with the icon at the lower right side of the icon associated with the current page as a target page, if the flipping gesture of obliquely sliding to the upper left is applied on the page flipping region; retrieving a page associated with the icon at the upper left side of the icon associated with the current page as a target page, if the flipping gesture of obliquely sliding to the lower right is applied on the page flipping region; and retrieving a page associated with the icon at the lower left side of the icon associated with the current page as a target page, if the flipping gesture of obliquely sliding to the upper right is applied on the page flipping region; and
  - a display control module, configured for displaying the target page on the page flipping region, and displaying the created new icon group on the page preview region.

6. The electronic device as described in claim 5, wherein the type of the flipping gesture is further selected from the group consisting of: horizontally sliding leftward, horizontally sliding rightward, vertically sliding upward, and vertically sliding downward.

7. The electronic device as described in claim 6, wherein:
- if the gesture identifying module determines the type of the flipping gesture of the user is horizontally sliding leftward applied on the page flipping region, the page processing module retrieves a page associated with the neighboring icon at the right side of the icon associated with the current page as a target page;
- if the gesture identifying module determines the type of the flipping gesture of the user is horizontally sliding rightward applied on the page flipping region, the page processing module retrieves a page associated with the neighboring icon at the left side of the icon associated with the current page as a target page;
- if the gesture identifying module determines the type of the flipping gesture of the user is vertically sliding upward applied on the page flipping region, the page processing module retrieves a page associated with the neighboring icon below the icon associated with the current page as a target page; and
- if the gesture identifying module determines the type of the flipping gesture of the user is vertically sliding downward applied on the page flipping region, the page processing module retrieves a page associated with the neighboring icon above the icon associated with the current page as a target page.

8. The electronic device as described in claim 5, wherein the icon group comprises a plurality of icons arranged in an array.

9. A page flipping method, comprising:
- displaying an icon group on a first region of a display screen, and a current page on a second region thereof, the icon group comprising a plurality of icons, each icon corresponding to a page, the icon corresponding to the current page being marked;
- determining a touch gesture applied on the second region, where the touch gesture is a slide operation selected from a group consisting of: horizontally leftward, horizontally rightward, vertically upward, vertically downward, obliquely to the lower left, obliquely to the upper left, obliquely to the lower right, and obliquely to the upper right;
- determining a target page according to the touch gesture, wherein: if the slide operation is performed horizontally leftward, the icon associated with the target page is at the right side of the marked icon; if the slide operation is performed horizontally rightward, the icon associated with the target page is at the left side of the marked icon; if the slide operation is performed vertically upward, the icon associated with the target page is below the marked icon; and if the slide operation is performed vertically downward, the icon associated with the target page is above the marked icon; if the slide operation is performed obliquely to the lower left, the icon associated with the target page is at the upper right side of the marked icon; if the slide operation is performed obliquely to the upper right, the icon associated with the target page is at the lower left side of the marked icon; if the slide operation is performed obliquely to the upper left, the icon associated with the target page is at the lower right side of the marked icon; and if the slide operation is performed obliquely to the lower right, the icon associated with the target page is at the upper left side of the marked icon;
- retrieving the target page from a storage unit;
- creating a new icon group according to the retrieved target page; and
- displaying the retrieved target page on the second region and displaying the created new icon group on the first region.

10. The method as described in claim 9, wherein the icon group comprises an array of icons.

* * * * *